No. 790,674. PATENTED MAY 23, 1905.
B. H. CAMDEN.
AZIMUTH INSTRUMENT.
APPLICATION FILED JUNE 1, 1904.

2 SHEETS—SHEET 1.

Witnesses.
E. B. Gilchrist
J. M. Welles

Inventor.
Bernard H. Camden,
By Fouts & Hull,
Attorneys.

No. 790,674.  
B. H. CAMDEN.  
AZIMUTH INSTRUMENT.  
APPLICATION FILED JUNE 1, 1904.
PATENTED MAY 23, 1905.
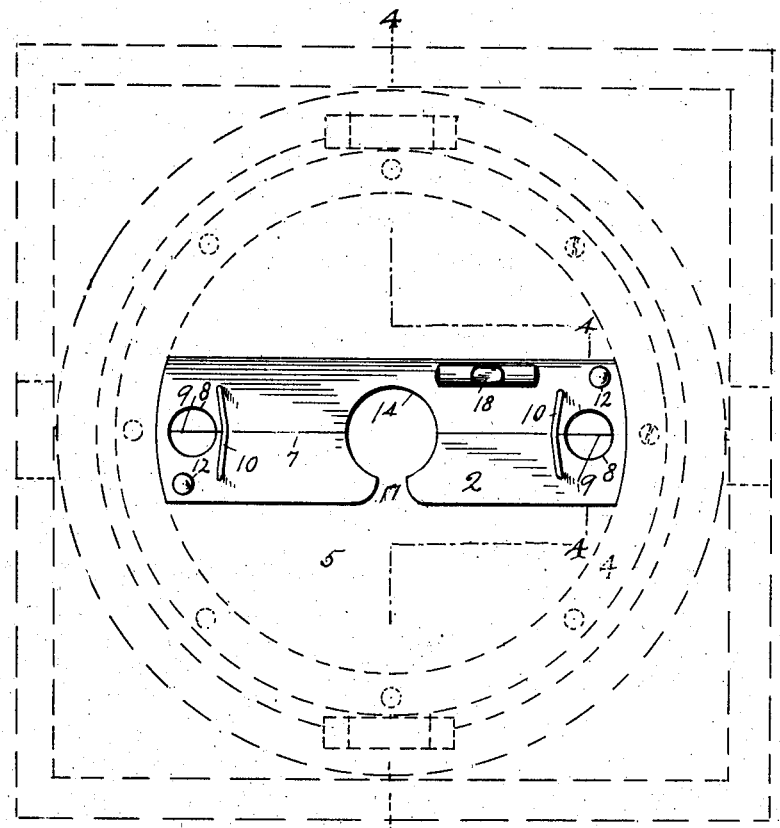
Fig. 3.
Fig. 4.
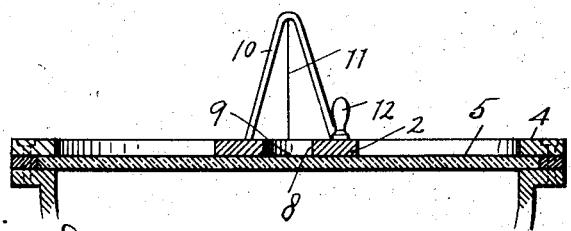
Witnesses.  
E. B. Gilchrist  
J. M. Welles
Inventor.  
Bernard H. Camden,  
By Fouts & Hull,  
Attorneys.

No. 790,674. Patented May 23, 1905.

UNITED STATES PATENT OFFICE.

BERNARD H. CAMDEN, OF BOSTON, MASSACHUSETTS.

AZIMUTH INSTRUMENT.

SPECIFICATION forming part of Letters Patent No. 790,674, dated May 23, 1905.

Application filed June 1, 1904. Serial No. 210,676.

*To all whom it may concern:*

Be it known that I, BERNARD H. CAMDEN, lieutenant United States Revenue-Cutter Service, stationed at Boston, in the county of Suffolk and State of Massachusetts, have invented a certain new and useful Improvement in Azimuth Instruments, of which the following is a full, clear, and exact description, reference being had to the accompanying drawings.

My invention relates to azimuth instruments for use with marine compasses, and has for its object the production of an instrument of this type that will be simple, durable, and comparatively inexpensive of construction, that may be readily applied to and removed from the ordinary compass, that will accurately record the bearing of the sun or other object which is observed, and that will be susceptible of easy operation in a rough sea.

The invention may be defined generally as consisting in the combinations of elements embodied in the claims hereto annexed.

Figure 1:
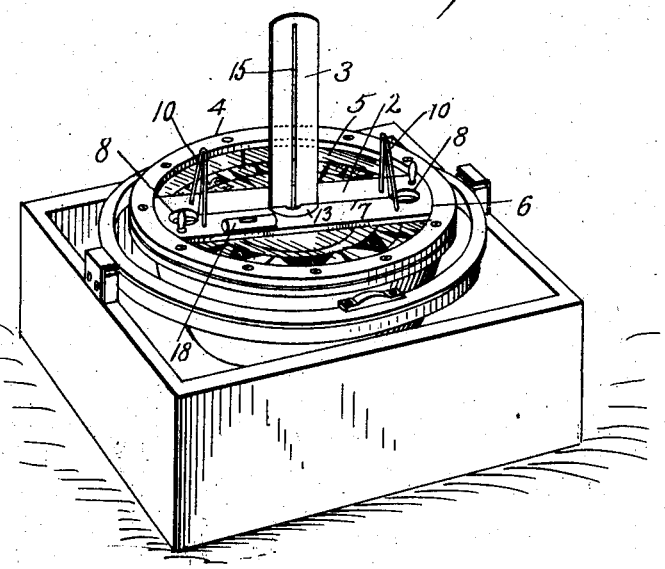
Figure 2:
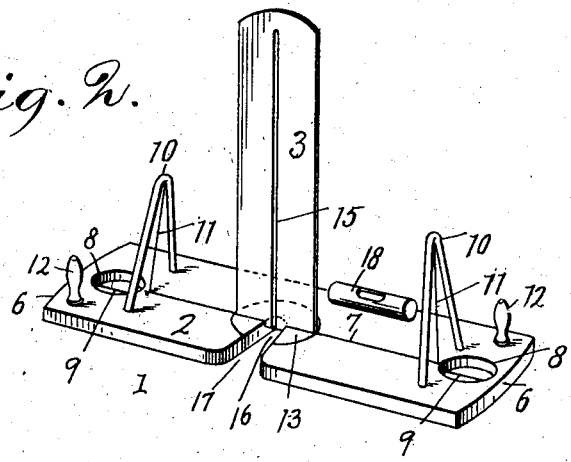

Referring to the drawings, Figure 1 represents a perspective view of a marine compass of ordinary construction having applied thereto my instrument. Fig. 2 represents an enlarged perspective view of my instrument, said view being taken from the side opposite to that from which Fig. 1 is viewed. Fig. 3 represents a plan view showing my instrument applied to a compass, the compass being shown in dotted lines and the vertical member of my instrument being removed. Fig. 4 represents a transverse sectional view taken on the line 4 4 of Fig. 3, showing my instrument and a portion of the compass to which the same is applied.

Describing the parts by reference characters, 1 represents my instrument, the same consisting generally of two portions—viz., a horizontal supporting member 2 and a vertical member 3. The horizontal member consists of an oblong plate 2, said plate being of sufficient length to fit within the ring 4 of the ordinary compass, resting upon the glass covering 5 thereof. The ends 6 of said plate are rounded off, the center of curvature of such rounded ends being the center of the compass circle or ring 4, the plate fitting snugly within the inner periphery of said ring. This insures that when said plate is placed upon the glass covering 5 the longitudinal axis of said plate will correspond with a diameter of said ring. A line 7 is formed on said plate, as by scoring the metal thereof, said line corresponding to the axis of the plate and a diameter of the ring 4. Adjacent to each end of said plate there is a sight-opening 8, extending through said plate above the scale on the compass-card. A wire 9, forming, in effect, an extension of the line 7, spans each of the openings 8. Adjacent to each of the sight-openings 8 and preferably between the same and the center of the plate there is provided a yoke 10, which may be of inverted-V shape, as shown. Extending perpendicularly from the top of each of said yokes to the plate 2 and intersecting the line 7 is a sight-wire 11. By means of the operating handle or lug 12 at each end of the plate the latter may be rotated in order to take the bearing of any object by means of the wires 11. The bearing of such object may then be readily observed by noting the position of the appropriate wire 9 with respect to the compass-circle therebelow.

In taking an azimuth of the sun or other heavenly body I employ with the base member above described a vertical member 3. This vertical member is provided with a base 13, preferably of circular form, socketing in a corresponding recess 14 in the member 2. When in operative position, the plane of the vertical member 3 is in the plane of the line 7 of the base member. Extending vertically from a point above the center of the base member 2 (and the center of the compass-circle) is a slot 15, said slot extending nearly to the top of the vertical member. To facilitate adjusting the vertical member, as well as to permit the taking of an azimuth when the sun is low, the central part of the base of such member is provided with a flaring slot or recess 16, which registers with a corresponding flaring slot or recess 17 in the base member. When both slots are in register, the plane of the vertical member is in the plane of the line 7, thereby insuring that such member shall be accurately positioned for taking an observation. A level 18, parallel with the plane of the vertical member, is secured to the base member 2, whereby the compass may be leveled in the direction of said base member at the time of taking an observation of the sun or other heavenly body.

The various parts of this instrument are of course made of non-magnetic material.

In order to take an azimuth, as of the sun, the base member is rotated by means of the lugs or handles 12 until the member 3 is substantially at right angles to the sun, whereupon a thin ray of light will be projected through the slit 15 across the upper face of the compass, marking the reverse bearing of the sun. In reading such bearing with my instrument it is necessary only to keep the base member 2 level, as by depressing the compass by means of the finger, reading the bearing while the instrument is level. Owing to the thinness of the metal of the vertical member, I can provide the same with a sufficiently narrow slot to insure an accurate bearing and at the same time make it unnecessary to set said vertical member at exactly right angles to the sun. In practice the ship may swing through three or four points of the compass without cutting off the beam of light passing through said slit, thereby rendering unnecessary the exercise of any particular care or attention in steering the vessel. The extreme simplicity of the device, making it necessary only to level the base member 2 by means of the finger, together with the adaptability of the same to accurate reading, renders said device peculiarly adapted for taking an accurate azimuth in a rolling sea.

In order to take the bearing of a distant object, the vertical member may be removed and the base member rotated until the vertical wires 11 are brought to bear upon the object. The direct bearing of said object may be read through the sight-opening 8 at the end of the base member, which is directed toward said object, while its reverse bearing may be read through the other opening. The employment of the sight-holes with the wires extending across the same in the axial line of the base member provides a simple and accurate device for reading the bearing of the object on the compass-card below said member.

In order to head the vessel on any desired magnetic bearing, I employ both the vertical and the base member, as follows: By means of the vertical member the magnetic bearing of the sun may be obtained in the manner heretofore indicated. Having observed this bearing, then by means of the sight-openings in the base member set the instrument at an angle with the lubber's point on the compass equal to the angle between the desired ship's course and the observed magnetic bearing of the sun. Swing the ship until the shadow from the vertical wire 11 at the end of the instrument near the sun falls on the longitudinal line 7. The ship is then heading on the desired magnetic course. In a similar manner the ship can be headed on a magnetic course when the magnetic bearing of a distant object is known. As the vertical member will be in the way of observing the shadow cast by the vertical wire at the end of the base member, said vertical member may be removed before swinging the ship.

From the foregoing description it will be apparent that I have produced an azimuth instrument which is extremely simple and economical in construction, which will not readily get out of adjustment, there being no reflecting mirrors or prisms employed therewith, which will enable the operator to take azimuth bearings with great facility and accuracy, which may be easily operated to head the vessel on any desired magnetic course, and which will by the employment of the slotted vertical member permit the employment of the instrument on a cloudy day.

While I have described my invention in detail, it will be obvious that such details may be departed from more or less without departing from the spirit of my invention, and I do not propose to be limited to such details except as they may appear in the claims hereto annexed or be rendered necessary by the prior art.

Having thus described my invention, what I claim as new, and desire to secure by Letters Patent, is—

1. The combination of a compass having the usual ring, of an azimuth attachment therefor comprising a longitudinal base member adapted to fit within said ring and provided at its opposite ends with means for centering said member within the ring, a vertical member carried by said base member and provided with a vertical slot, a level extending parallel with the plane of the face of said vertical member, said base member being rotatable within said compass-ring, substantially as described.

2. An azimuth attachment for compasses comprising a base member adapted to rest upon the top of a compass and to fit closely within diametrically opposite points of the compass-ring and having a central socket and a traverse slot extending from said socket to one of the edges of said base member which is parallel with the longitudinal axis thereof, a vertical member provided with a base fitting in the socket in the base member, said base being provided with a slot extending beyond its center and constituting a continuation of the slot in the base member, whereby the vertical member is readily positioned and the reading of a heavenly body near the horizon is facilitated, substantially as described.

3. An azimuth instrument consisting of a member adapted to rest and be rotated upon the top of a compass, a sight-vane adjacent to each end of said member, said member being provided with diametrically opposite openings therethrough above the compass-card, and a wire in each opening by means of which the bearings may be read on the card, substantially as described.

4. An azimuth instrument consisting of a member adapted to rest upon the top of a compass within the inner periphery of the ring thereof and extending diametrically across said compass, said member being provided near each end with an opening therethrough above the compass-card, a sight-vane carried by said member adjacent to each of said openings and each provided with a vertical wire, a wire extending across each of said openings, all of said wires being in a vertical plane corresponding to a diameter of the compass-card, substantially as described.

5. In combination with a compass, an attachment therefor consisting of a member adapted to rest and be rotated upon the top of said compass, a sight-vane adjacent to each end of said member, said member being provided with means located above the compass-card for indicating with said card the bearing of an object, substantially as described.

6. An attachment for use with compasses consisting of a base member adapted to rest and be rotated on a compass, said base member having an axial line thereon and having adjacent to an end thereof means for indicating with the compass-card a desired course or bearing, a vertical member adjacent to said end of the base member and in the vertical plane of the axial line, and a central vertical member having means coöperating with the compass-card for indicating thereon the bearing of the sun or other heavenly body, substantially as described.

7. An attachment for use with compasses consisting of a base member adapted to rest and be rotated on a compass, said base member having an axial line thereon corresponding to a diameter of the compass and a sight-opening adjacent to an end of the same with a wire extending across the same, a vertical wire adjacent to said opening, both of said wires and said axial line being in the same vertical plane, and a central vertical member supported by said base member and provided with means coöperating with the compass-card for indicating thereon the bearing of the sun or other heavenly body, substantially as described.

8. An azimuth attachment for compasses comprising a base member adapted to rest upon the top of a compass and be rotated thereupon, a vertical member supported by said base member above the center of the compass, said vertical member being provided with a slot extending through the base member and said base member being provided with a cut-out portion or recess therein corresponding to and registering with the slot in the vertical member, whereby the bearing of a heavenly body near the horizon may be observed.

9. An azimuth attachment for compasses comprising a base member having near each end thereof a sight-vane, a central vertical member supported by said base member and having means for indicating the bearing of the sun or other heavenly body, said vertical member being movably fitted to said base member, whereby an unobstructed field of sight between said vanes may be afforded.

10. An attachment for compasses consisting of a base member adapted to be rotated above the compass, said base member being provided with a line in the vertical plane of a diameter of the compass and having adjacent to an end thereof means for indicating with the compass-card a desired course or bearing, a sight-vane adjacent to said end of the base member, said vane being in the plane of the line on the base member, and a central vertical member also in the plane of said line and having means for indicating the bearing of a heavenly body.

In testimony whereof I affix my signature in the presence of two witnesses.

BERNARD H. CAMDEN.

Witnesses:
S. M. ROCK,
H. D. HINCKLEY.